United States Patent [19]

Gupta et al.

[11] Patent Number: 5,006,599

[45] Date of Patent: Apr. 9, 1991

[54] USE OF 3,5-DI-TERT-BUTYL-4-HYDROXYPHENYL-PROPIONIC ACID FOR STABILIZING POLYETHER POLYOLS

[75] Inventors: Pramod Gupta, Bedburg; Hans-Wilhelm Engels, Kerpen; Hansjürgen Rabe, Leverkusen, all of Fed. Rep. of Germany

[73] Assignee: Bayer Aktiengesellschaft, Leverkusen, Fed. Rep. of Germany

[21] Appl. No.: 450,894

[22] Filed: Dec. 14, 1989

[30] Foreign Application Priority Data

Dec. 21, 1988 [DE] Fed. Rep. of Germany ....... 3842945

[51] Int. Cl.$^5$ .............................................. C08L 75/08
[52] U.S. Cl. ................................. 524/740; 252/182.27; 252/404; 568/581
[58] Field of Search ................... 524/740; 252/182.27, 252/404; 568/581

[56] References Cited

U.S. PATENT DOCUMENTS

| | | | |
|---|---|---|---|
| 3,723,489 | 3/1973 | Dexter et al. | 260/429.7 |
| 3,763,093 | 10/1973 | Kletcka et al. | 260/45.8 |
| 4,021,385 | 5/1977 | Austin et al. | 260/2.5 |
| 4,070,304 | 1/1978 | Hinze | 252/404 |
| 4,371,647 | 2/1983 | Minagawa et al. | 524/120 |
| 4,444,676 | 4/1984 | Statton et al. | 252/182 |

*Primary Examiner*—Maurice J. Welsh
*Attorney, Agent, or Firm*—Joseph C. Gil; Richard E. L. Henderson

[57] ABSTRACT

The present invention relates to a method for stabilizing a polyether polyol having a molecular weight of from about 300 to about 10,000 comprising adding 3,5-di-tert-butyl-4-hydroxyphenylpropionic acid as an antioxidant stabilizer, optionally in combination with other antioxidants, to said polyether polyol. This invention further relates to polyols stabilized by the method of this invention and to stabilized polyurethanes prepared from such stabilized polyols.

7 Claims, No Drawings

USE OF 3,5-DI-TERT-BUTYL-4-HYDROXYPHENYLPRO- PIONIC ACID FOR STABILIZING POLYETHER POLYOLS

BACKGROUND OF THE INVENTION

The present invention relates to the use of 3,5-di-tert-butyl-4-hydroxyphenylpropionic acid ("BHP") as a stabilizer for polyether polyols and for polyurethanes produced from polyether polyols.

Stabilizers or antioxidants for polyethers and polyurethanes are well known and are typically sterically hindered phenols, bisphenols, dialkyl diphenylamines, phenolthiazines, phosphites, and mixtures of compounds of these chemical classes. For example, U.S. Pat. Nos. 4,070,304 and 4,444,676, German Offenlegungsschrift 2,557,619, and European Patent Application 38,876. The efficacy of antioxidants is determined both by the nature of the chemical class (for example, diphenylamines, phenothiazines, and sterically hindered phenols) and by substrate compatibility.

2,6-Di-tert-butyl-4-methylphenol ("BHT") is frequently used for stabilizing polyether polyols, either alone or combined with other compounds of the stabilizer classes described above. Disadvantages of BHT include relatively high volatility and a tendency to migrate into substrates covering the polyurethanes. As a result, a strong yellow coloring develops in the substrates in an atmosphere charged with nitrogen oxides ("$NO_x$"), such as found in industrial areas or areas with heavy traffic flow. Stabilizers not having these disadvantages are therefore of interest. The object of the present invention is to provide suitable stabilizers. It has been found that 3,5-di-tert-butyl-4-hydroxyphenylpropionic acid is a suitable stabilizer for polyether polyols of molecular weight 300 to 10,000.

Metal salts of 3,5-di-tert-butyl-4-hydroxyphenylpropionic acid are described in German Offenlegungsschrift 209,102 for stabilizing organic material, whereby the substrate-dependent efficacy depends to a large extent upon the metal atom used.

SUMMARY OF THE INVENTION

The present invention relates to a method for stabilizing a polyether polyol having a molecular weight of from about 300 to about 10,000 comprising adding 3,5-di-tert-butyl-4-hydroxyphenylpropionic acid as an antioxidant stabilizer, optionally in combination with an antioxidant other than 3,5-di-tert-butyl-4-hydroxyphenylpropionic acid, to the polyether polyol.

This invention further relates to polyols stabilized by the method of this invention and to stabilized polyurethanes prepared from such stabilized polyols.

DETAILED DESCRIPTION OF THE INVENTION

Compounds containing free carboxyl groups as substituents are not normally considered particularly efficient stabilizers. Consequently, derivatives of carboxylic acids, such as esters, amides, hydrazides, and other derivatives, are generally used. It has now surprisingly been found, however, that 3,5-di-tert-butyl-4-hydroxyphenylpropionic acid ("BHP") is ideally suited as a stabilizing antioxidant in the production of polyether polyols having a molecular weight range of about 300 to about 10,000. BHP can be produced by the base-catalyzed addition of acrylic acid methyl ester to 2,6-di-tert-butylphenol followed by saponification (German Offenlegungsschrift 2,120,285) or can be obtained commercially.

Depending on the basic structure of the polyether polyol, combinations with conventional antioxidants are also suitable. In general, about 0.01 to about 4.0 preferably 0.01–1.0 percent by weight of 3,5-di-tert-butyl-4-hydroxyphenylpropionic acid can be used in combination with about 0.01 to 0.5 percent by weight of other antioxidant stabilizers, the quantities being based on the amount of polyether polyol.

BHP can be used with any customary polyether polyols, such as mono-, di-, tri-, tetra- and hexafunctional polyethers, as well as mixtures thereof, prepared by reacting epoxides with combinations of starter alcohols. Such polyethers can be prepared from conventional epoxides in pure form or in mixtures.

When made from polyether polyols prepared and stabilized as described above and using otherwise conventional formulations, finished polyurethanes and polyurethane foam plastics are surprisingly resistant to core discoloration and to yellowing of covers (such as textile or leather) exposed to nitrogen oxides. As discussed above, such discoloration occurs in materials conventionally stabilized using BHT, which migrates into the covers and reacts with $NO_x$ in the presence of moisture to give a strong yellow color.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

EXAMPLE 1

Compositions containing a long-chain polyether derived from ethylene oxide ("EO") and propylene oxide ("PO") with secondary hydroxyl groups and having a hydroxyl value of 46 and a molecular weight of approximately 4,000 was prepared with each of the following additional components:

(a) 0.15% 3,5-di-tert-butyl-4-hydroxyphenylpropionic acid ("BHP")

(b) 0.01% BHP and 0.01% octylized diphenylamine (Vulkanox OCD available from Bayer AG, West Germany)

(c) 0.10% 2,6-di-tert-butyl-4-methylphenol ("BHT") and 0.10% octylized diphenylamine (Vulkanox OCD)

All polyether compositions were foamed using a modern conventional formulation for flexible foam e.g. according to U.S. Pat. No. 4 070 304. The foams were tested by a special hot air test in which each foam was injected at a nominal temperature of 207° C. with air and then observed for discoloration around the injecting spot:

(a) 15 $cm^2$ yellow (actual air temperature 203° C.)

(b) 25 $cm^2$ yellow, 7 $cm^2$ brown (actual air temperature 206° C.)

(c) 80 $cm^2$ yellow, 22 $cm^2$ brown (actual air temperature 209° C.)

A "yellowing test" using foam material covered with terry cloth gave the following results:

(a) no yellow discoloration of the material
(b) no yellow discoloration of the material
(c) characteristic yellow discoloration in the vicinity of the circulating flow

EXAMPLE 2

Compositions containing a long-chain polyether derived from EO and PO with primary hydroxyl groups and having a hydroxyl value of 35 and a molecular weight of approximately 5,000 was prepared with each of the following additional components:
(a) 0.10% BHT
(b) 0.10% BHP
(c) 0.10% 3,5-di-tert-butyl-4-hydroxybenzoic acid All polyether compositions were foamed using a modern conventional formulation for flexible foam. The foams were tested by a special hot air test in which each foam was injected with air at a nominal temperature of 207° C. and then observed for discoloration around the injecting spot:
(a) 80 cm$^2$ yellow, 35 cm$^2$ brown
(b) no yellowing
(c) 50 cm$^2$ yellow, 15 m$^2$ brown The advantages of 3,5-di-tert-butyl-4-hydroxyphenylpropionic acid as compared to the other phenolic carboxylic acids is particularly evident from Example 2(c).

A "yellowing test" using foam material covered with terry cloth gave the following results:
(a) characteristic yellow discoloration in the vicinity of the circulating flow
(b) no discoloration of the material
(c) no discoloration of the material The "yellowing test" is carried out as follows:
A terry cloth is moistened with a textile softener, then the foam sample is enveloped with that treated textile and applied to a venting oven for at least 24 hours. The dry terry cloth in then inspected for yellow color.

What is claimed is:
1. A method for stabilizing a polyether polyol having a molecular weight of from about 300 to about 10,000 comprising adding an antioxidant stabilizer in an amount of about 0.01 to about 4% by weight to said polyether polyol, wherein said stabilizer comprises 3,5-di-text-butyl-4-hydroxyphenylpropionic acid.

2. A method according to claim 1 for stabilizing a polyether polyol having a molecular weight of from about 300 to about 10,000 comprising adding an antioxidant stabilizer to said polyether polyol, wherein said stabilizer comprises about 0.01 to about 1.0 percent by weight, based on the polyether polyol, of 3,5-di-tert-butyl-4-hydroxyphenylpropionic acid.

3. A method according to claim 2 wherein said stabilizer is a combination of from about 0.01 to about 1.0 percent by weight, based on the polyether polyol, of 3,5-di-tert-butyl-4-hydroxyphenylpropionic acid and from about 0.01 to about 0.5 percent by weight, based on the polyether polyol, of an antioxidant other than 3,5-di-tert-butyl-4-hydroxyphenylpropionic acid.

4. A polyether polyol having a molecular weight of from about 300 to about 10,000 stabilized with from about 0.01 to about 1.0 percent by weight, based on the polyether polyol, of 3,5-di-tert-butyl-4-hydroxyphenylpropionic acid.

5. A polyether polyol having a molecular weight of from about 300 to about 10,000 stabilized with a combination of from about 0.01 to about 1.0 percent by weight, based on the polyether polyol, 3,5-di-tert-butyl-4-hydroxyphenylpropionic acid and from about 0.01 to about 0.5 percent by weight, based on the polyether polyol, of an antioxidant stabilizer other than 3,5-di-tert-butyl-4-hydroxyphenylpropionic acid.

6. A polyurethane prepared by reacting a polyether polyol according to claim 4 with a polyisocyanate.

7. A polyurethane prepared by reacting a polyether polyol according to claim 5 with a polyisocyanate.

* * * * *